United States Patent [19]
Attwood et al.

[11] Patent Number: 5,394,319
[45] Date of Patent: Feb. 28, 1995

[54] NON-COUPLED INTEGRATED MAGNETIC STRUCTURE

[76] Inventors: Brian E. Attwood, 3 Peel House Bartellot Rd., Horsham, West Sussex RH12 1DQ, United Kingdom; Michael J. Finazzo, 2042 Valley Rd., Oceanside, Calif. 92056

[21] Appl. No.: 49,621

[22] Filed: Apr. 19, 1993

Related U.S. Application Data

[63] Continuation of Ser. No. 743,749, Aug. 12, 1991, abandoned.

[30] Foreign Application Priority Data

Oct. 18, 1990 [GB] United Kingdom ............... 902269

[51] Int. Cl.⁶ .......................................... H02M 3/28
[52] U.S. Cl. ........................................ 363/20; 363/21; 336/200; 336/215
[58] Field of Search ............... 363/20, 21; 336/215, 336/200; H02M 3/28, 3/335

[56] References Cited

U.S. PATENT DOCUMENTS

| | | |
|---|---|---|
| 3,231,841 | 1/1966 | Ohtake . |
| 4,550,364 | 10/1985 | Shaw ................................. 363/24 |
| 4,622,627 | 11/1986 | Rodriguez ......................... 363/37 |
| 4,675,796 | 6/1987 | Gautherin .......................... 363/20 |
| 4,730,241 | 3/1988 | Takaya ............................... 363/19 |
| 4,914,561 | 4/1990 | Rice et al. ........................ 363/123 |
| 4,937,729 | 6/1990 | Gadreau et al. ................. 363/134 |
| 4,961,128 | 10/1990 | Bloom ............................... 363/16 |
| 4,977,491 | 12/1990 | Domenget ......................... 363/15 |
| 5,003,451 | 3/1991 | Gradl et al. ..................... 363/56 |
| 5,010,314 | 4/1991 | Estrov ............................. 336/198 |
| 5,012,401 | 4/1991 | Barlage ............................. 363/97 |
| 5,077,543 | 12/1991 | Carlile ............................. 333/177 |

FOREIGN PATENT DOCUMENTS 2582166 5/1986 France .

OTHER PUBLICATIONS

Wustehube 'Schaltnetzteile' 1982, VDE Verlag, Berlin, FIG. 6.3.
IBM Technical Disclosure Bulletin, vol. 26, No. 11, pp. 6179–6180; Wallace 'Resonant Reset', Apr. 1984.

*Primary Examiner*—R. Skudy
*Assistant Examiner*—Adolf Berhane

[57] ABSTRACT

An integrated, non-coupled magnetic structure comprises a body of ferrite material with a plurality of through passages. A plurality of conductors pass through respective ones of the passages to form windings, certain of which have no magnetic field coupling and hence provide separate non-coupled magnetic functions. The magnetic structure is used as a component of a switching dc-to-dc converter, integrating the functions of isolation transformer, output filter and feedback signal coupling.

13 Claims, 9 Drawing Sheets

_FIG. 7_

_FIG. 8_

_Fig. 15_

_Fig. 16_

NON-COUPLED INTEGRATED MAGNETIC STRUCTURE

This application is a continuation of application Ser. No. 07/743,749, now abandoned, filed Aug. 12, 1991, the benefit of the filing dates of which are hereby claimed under 35 USC 120.

FIELD OF THE INVENTION

This invention relates to a magnetic structure which integrates functions normally requiring More than one structure or device.

BACKGROUND OF THE INVENTION

The invention is particularly, but not exclusively, applicable to low-power dc-to-dc converters of the kind used as computer power supplies, for example. In such converters the dc input is switched across the primary of an isolation transformer, and the secondary voltage is filtered and rectified to provide the output dc. It is well known that the weight and bulk of the transformer, and its cost, can be reduced by increasing the switching frequency but only at the expense of increasing the sophistication of the associated circuitry.

For example, it is known to provide a 12 V-5 V converter with a power handling capacity of a few watts operating in the range of 1.5-2.0 MHz, controlled by pulse width modulation of the primary switching. At these frequencies, the topography of the magnetic parts and associated circuits becomes important, and additional features must be introduced to control ripple currents and electromagnetic interference.

In certain known designs these requirements lead to the use of an isolation transformer, a second transformer used as an output filter and feedback signal source, and further inductors to inhibit ripple and common mode currents. These have normally been provided as discrete, spaced components leading to relatively high space requirements and costs. It has been proposed recently to use integrated magnetics where multiple functions are performed on a single magnetic structure. However, these proposals are based on arrangements where the various circuits are coupled with each other with the windings interlinked, and require specially made magnetic structures which are difficult to produce in quantity, typically relying on E-cores in which one leg has an air gap and the others have different size pole pieces.

BRIEF STATEMENT OF THE INVENTION

A principal object of the present invention is to provide a novel device which can be used as an integrated, non-coupled magnetic structure in high frequency converters or similar applications.

It is also an object of the invention to provide a magnetic structure suitable for large scale production of complete circuit packages.

The invention provides an integrated, non-coupled magnetic structure comprising a body of ferrite material formed with a plurality of through passages, and a plurality of conductor means each passing through a respective one of said passages, there being no direct interconnection between said conductor means.

The structure is suitably in the form of a ferrite slab, and preferably forms part of an electronic circuit arrangement having electronic components mounted on at least one of its major faces.

The invention also provides a dc-to-dc converter comprising:
  an input,
  an output,
  a first transformer having primary winding and a secondary winding,
  a switching element arranged to switch the input across the primary winding of the first transformer,
  oscillator means connected to control said switching element,
  the secondary winding of the first transformer being connected to the output via a path including a diode pair and a primary winding of a second transformer,
  the second transformer having a secondary winding connected to provide a feedback signal controlling operation of said oscillator means;
and in which said transformer windings are wound on a common integrated magnetic structure comprising a body of ferrite material formed with a plurality of passages through which said windings pass.

Other objects and features of the invention will be apparent from the following description of exemplary embodiments.

DETAILED DESCRIPTION OF THE EMBODIMENTS

Figure 1:
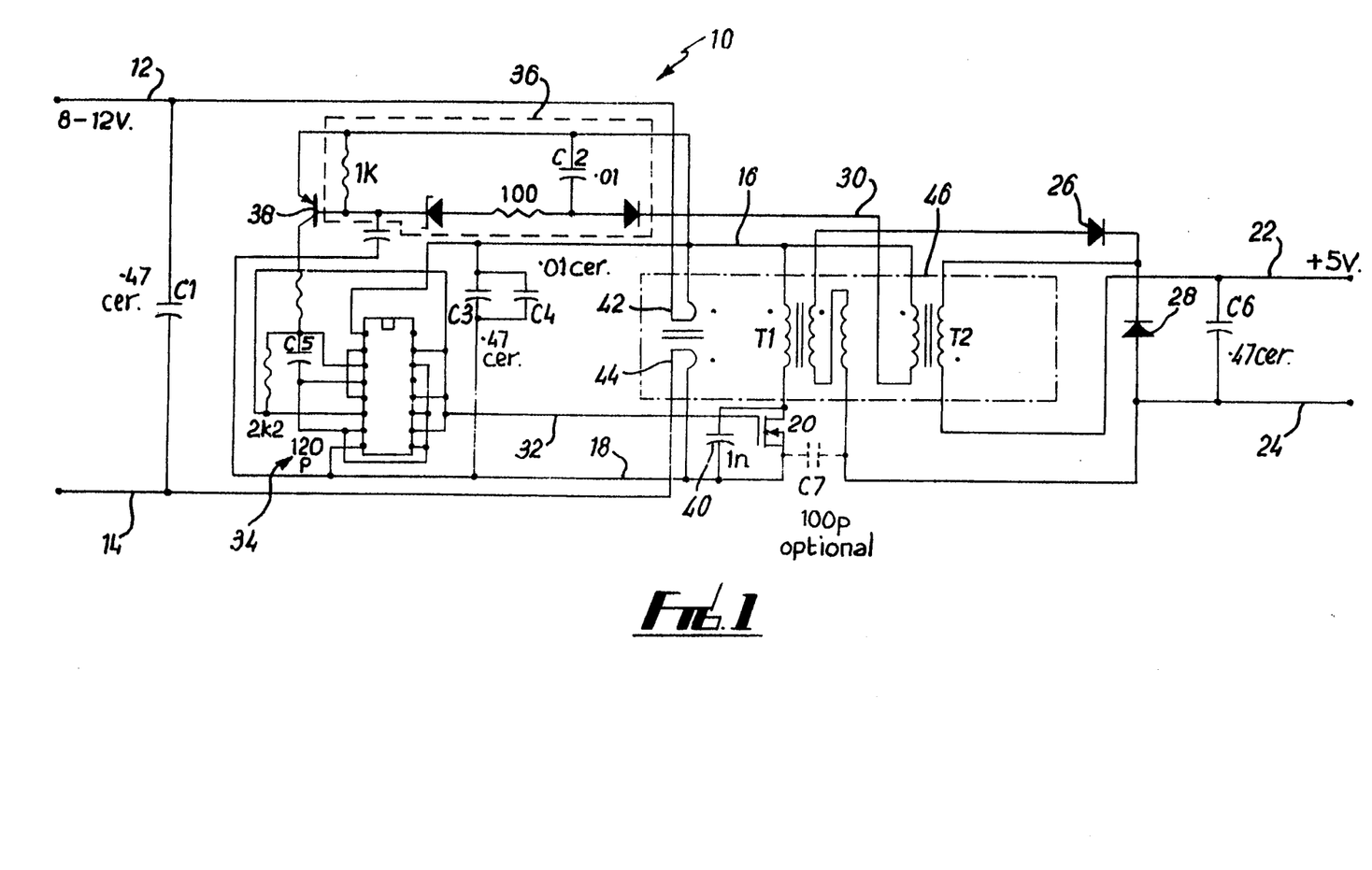
FIG. 1 is a circuit diagram of a dc-dc converter embodying the present invention.

Referring to FIG. 1, the converter 10 is a driven forward converter operating in resonant reset mode in the range 1–2 MHz. Input lines 12, 14 receive an input voltage of 8 to 12 V. Lines 12, 14 are connected as will be described in detail below to lines 16, 18 which are switched across the primary winding of an isolation transformer T1 by a MOSFET 20. The secondary winding of a transformer T1 supplies output lines 22, 24 via a half-wave rectifier pair 26, 28, the low side of T1 secondary being connected directly to negative output line 24 and the high side being connected to the output via a primary winding of coupling transformer T2. Coupling transformer T2 serves two functions: firstly as an output filter choke, and secondly to provide a feedback signal from its secondary at line 30. Ideally the windings of T1 and T2 should be wound bifilar or other filar according to the turns ratio required in order to achieve tight coupling.

Figure 2:
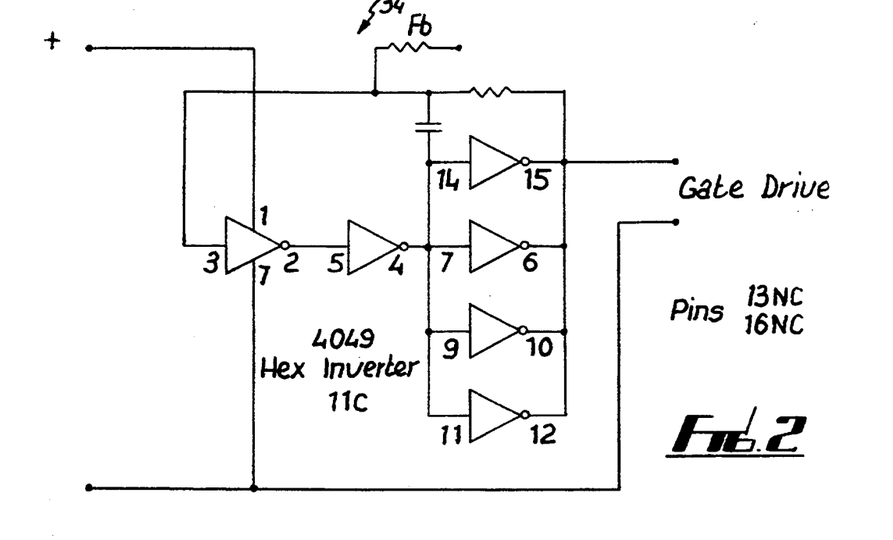
FIG. 2 shows part of the circuit of FIG. 1 in greater detail.

The main switching MOSFET 20, which is switched in forward converter mode, is controlled via line 32 by a square-wave generator 34, in this embodiment based on a CMOS hex inverter type 4049, in surface-mount device (SMD) form, connected as an astable ring-of-three oscillator with four sections paralleled for greater output. This is shown in greater detail in FIG. 2.

The feedback signal at line 30 is applied via filter 36 to control transistor 38, which is suitably type BSR16. The output transistor 38 is a dc feedback voltage, which is connected to control the mark:space ratio of the square-wave generator 34.

In an isolated regulated PWM topology it is necessary to cross the voltage isolation boundary with either information about the voltage level to allow primary side processing, or cross it with the actual frequency and duty cycle information after secondary side processing has taken place. By taking full advantage of the inherent good coupling, small size and low stray electric and magnetic fields of this new magnetic geometry, it is possible to achieve excellent output regulation at very low cost compared to using the first mentioned approach.

An analog peak voltage of the output DC voltage is magnetically coupled across the isolation boundary. The peak is detected, filtered and presented to the temperature compensated error amplifier as a true analog of the output voltage, minus the Vf of the commutating diode 28. Temperature errors not related to the load dependency Vf of diode 28 are compensated by the peak detector D3, as it is of the same type as diode 28.

In order to maintain phase as well as amplitude accuracy of the output voltage analog it is kept heavily loaded by the base junction of pnp transistor 38 and associated resistors.

The actual change in duty cycle necessary to regulate the output is achieved by adding an offset to the timing capacitor C5. It is this offset that ultimately unbalances the charge vs discharge periods that establish the oscillator frequency and duty cycle. It is also useful for 5 V input applications to bias the capacitor with a resistor to ground thus modifying the duty cycle.

It will be noted that a capacitor 40 is connected across the main switching MOSFET 20. In the example shown this is 1nF but other values may be necessary where circuit parameters change. In a single ended forward converter it is necessary to reset transformer core flux during the MOSFET off time to prevent core saturation and to limit the peak voltage across the switch. This is usually achieved by a reset winding. However by virtue of the circuit operating above 1 MHz the core flux can be reset by the resonance of the transformer primary inductance and either parasitic capacitances of the circuit or more preferably by scaling an external capacitor large enough to predominate over the parasitics. In the embodiments shown in FIGS. 1, 10 and 11 the primary inductance of T1 resonates predominately with external capacitor 40. This capacitor can also be split beneficially into two parts, one on the primary side and the other on the secondary, taking into account the turns ratio of transformer T1. Elimination of the conventional transformer reset winding mechanism improves efficiency and allows simpler transformer windings. It also reduces the overshoot and rapid voltage changes on primary and secondary thus reducing electromagnetic emissions.

The circuit of FIG. 1 also includes an input common mode filter provided by inductances 42, 44 interposed between lines 12, 14 and lines 16, 18.

In converters of the type described, it has hitherto been necessary to use separate magnetic structures for the isolation transformer, coupling transformer, and input common mode filter. It has also been necessary to use tantalum and/or electrolytic capacitors to achieve the required degree of filtering. These factors lead to relatively high size and cost. The present invention provides a magnetic structure which integrates the parts enclosed by dotted line 46 in FIG. 1, as will now be described.

Figure 3:
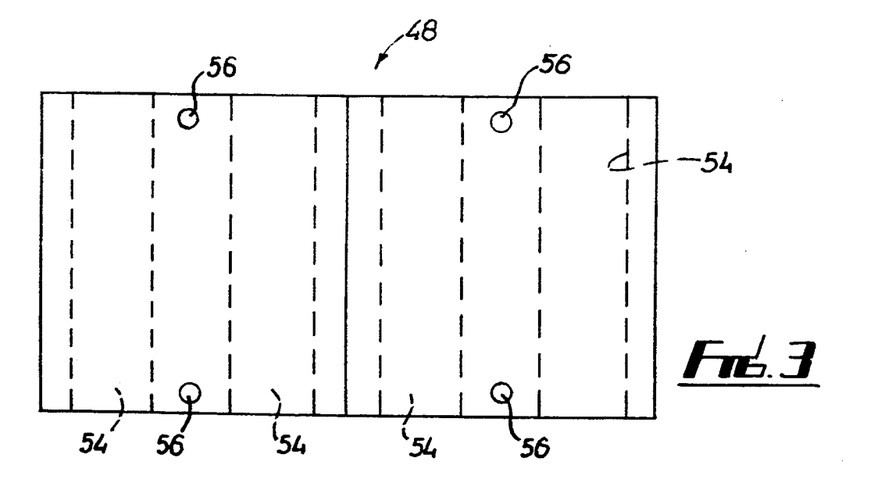
FIG. 3 is a plan view of a ferrite structure used in the circuit of FIG. 1.
Figure 4:
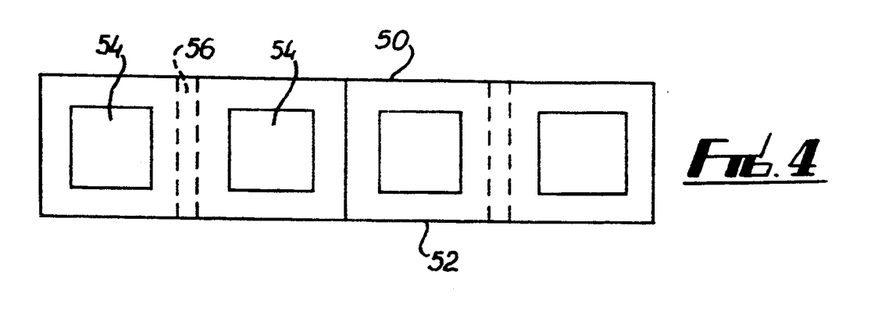
FIG. 4 is a side view of the ferrite structure.

FIGS. 3 and 4 show a ferrite structure 48 having planar top and bottom surfaces 50, 52 and four horizontal, square section through channels 54. Four vertical, cylindrical passages 56 are drilled near the edges of the structure 48. The structure 48 is of soft ferrite, preferably of B1 type. A prototype structure of the form shown in FIGS. 3 and 4 was made by gluing together two ferrite baluns by Philips Components, type no. 4313 020 20570 to give a unitary structure $22 \times 11 \times 5$ mm, and then drilling the passages 56. Other ferrite structures within the scope of the invention are discussed below.

Figure 5:
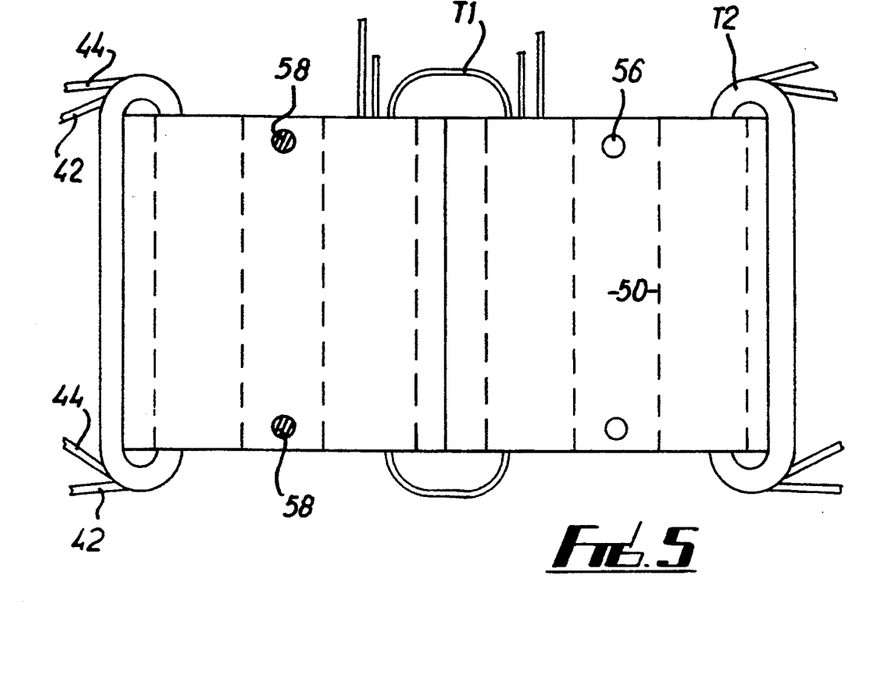
FIGS. 5 and 6 are plan and side views, respectively, illustrating an arrangement of windings on the ferrite structure of FIGS. 3 and 4.
Figure 6:
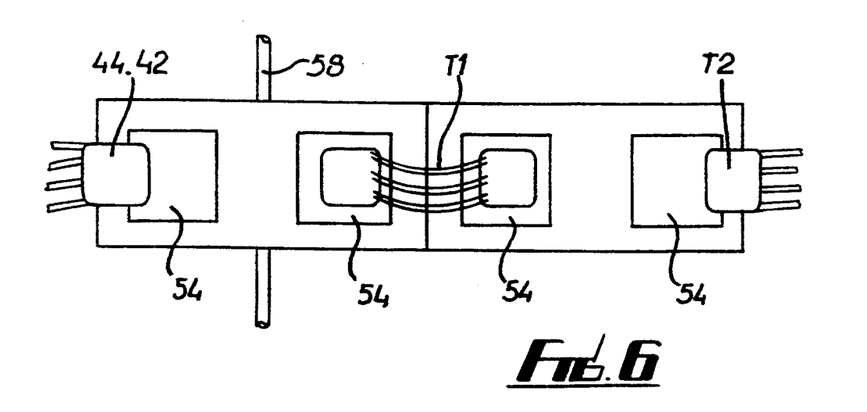

FIGS. 5 and 6 illustrate the ferrite structure 48 with windings as used in the embodiment of FIG. 1. The isolation transformer T1 has its primary and secondary windings arranged through one of the horizontal channels 54. For a typical 3 W, 2 MHz, 2:1 voltage ratio converter, the primary and secondary turns would be about 8 and 16 and for optimum coupling they should be trifilar wound. The output filter and feedback transformer T2 has its windings arranged through another of the channels 54. The input common mode filter inductances 42, 44 are provided by winding through another channel 54. It should be noted that this channel could be used interchangeably for an output common mode filter in place of the input as shown. By way of another example a 12 V input 9 V output unit should have a quadrafilar winding for T2, 1 winding for the primary and 3 windings series connected for the secondary. Vertical passages 58 may be optionally used as ferrite bead attenuators on input and output lines.

This magnetic arrangement is non-coupled; that is, there is no attempt to couple the magnetic fields together to achieve cancellation of signals. Each inductor has its own magnetic path separate from the others.

The embodiment thus far described has been found to give peak-to-peak ripple on both input and output of less than 30 mV, and to allow the use of only small ceramic capacitors. In FIG. 1, capacitors C1–C6 are ceramics of the values shown. Optionally, capacitor C7 of 100 pF may be included between primary and secondary grounds to further reduce common mode noise current: this has been measured in a prototype circuit at as little as 3 mA.

Figure 7:
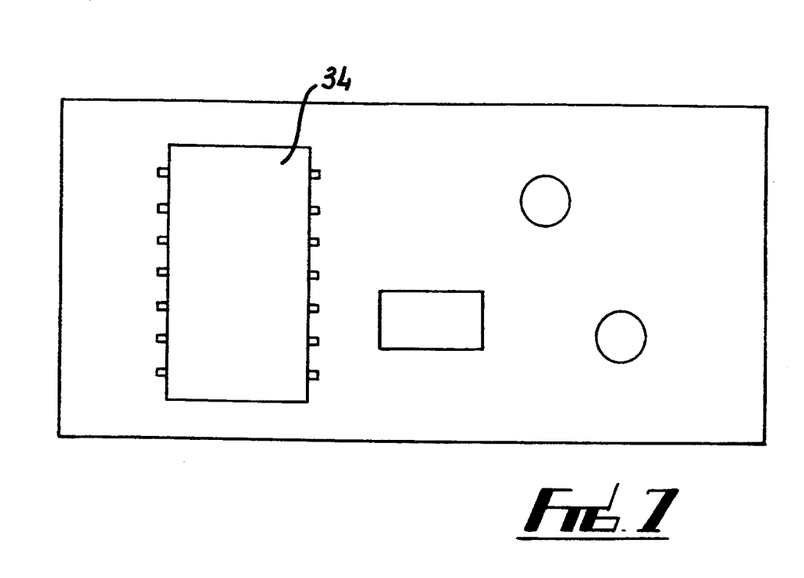
FIGS. 7 and 8 are plan and side views, respectively, showing the mounting of components on the structure of FIGS. 3 and 4.
Figure 8:
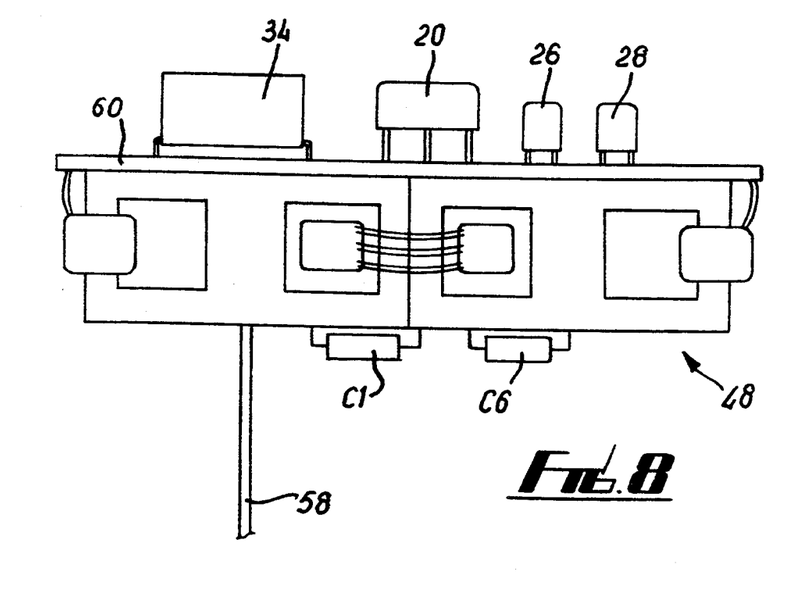

In accordance with an important aspect of the invention, the ferrite structure 48 is also used as a mount for the other components. FIGS. 7 and 8 illustrate an arrangement with the hex inverter 34 and other SMD components mounted on a pcb 60 of a size approximately $26 \times 15$ mm. The underside of pcb 60 has three copper pads bonded direct to the ferrite to provide input positive, input common and output common terminals. The pcb 60 may suitably be of Kapton foil 0.008 inch thick. The underside of the ferrite structure may also be used for mounting components, for example the main input and output capacitors C1 and C6. Also, the input leads 58 can be extended as shown to provide connections between the converter and other circuitry, for example by mounting to a pcb.

It would also be possible to use the ferrite itself, rather than a separate pcb film, as the mount for SMDs. Standard nickel/zinc ferrites have sufficiently high resistivity to be regarded as an insulating mount for this purpose, and could have circuit tracks printed directly on them. If higher resistivity is required, this can be achieved by heating the ferrite to produce an oxide coating.

The ferrite structure additionally functions as an effective heat sink for the dissipative components such as the MOSFET 20 and output diodes 26, 28.

The embodiment described with reference to FIGS. 1 to 8 can handle 3 W with a power/volume figure of 25 W/in$^3$. Use of a dedicated ASIC could increase this to 50 W/in$^3$.

Figure 9:
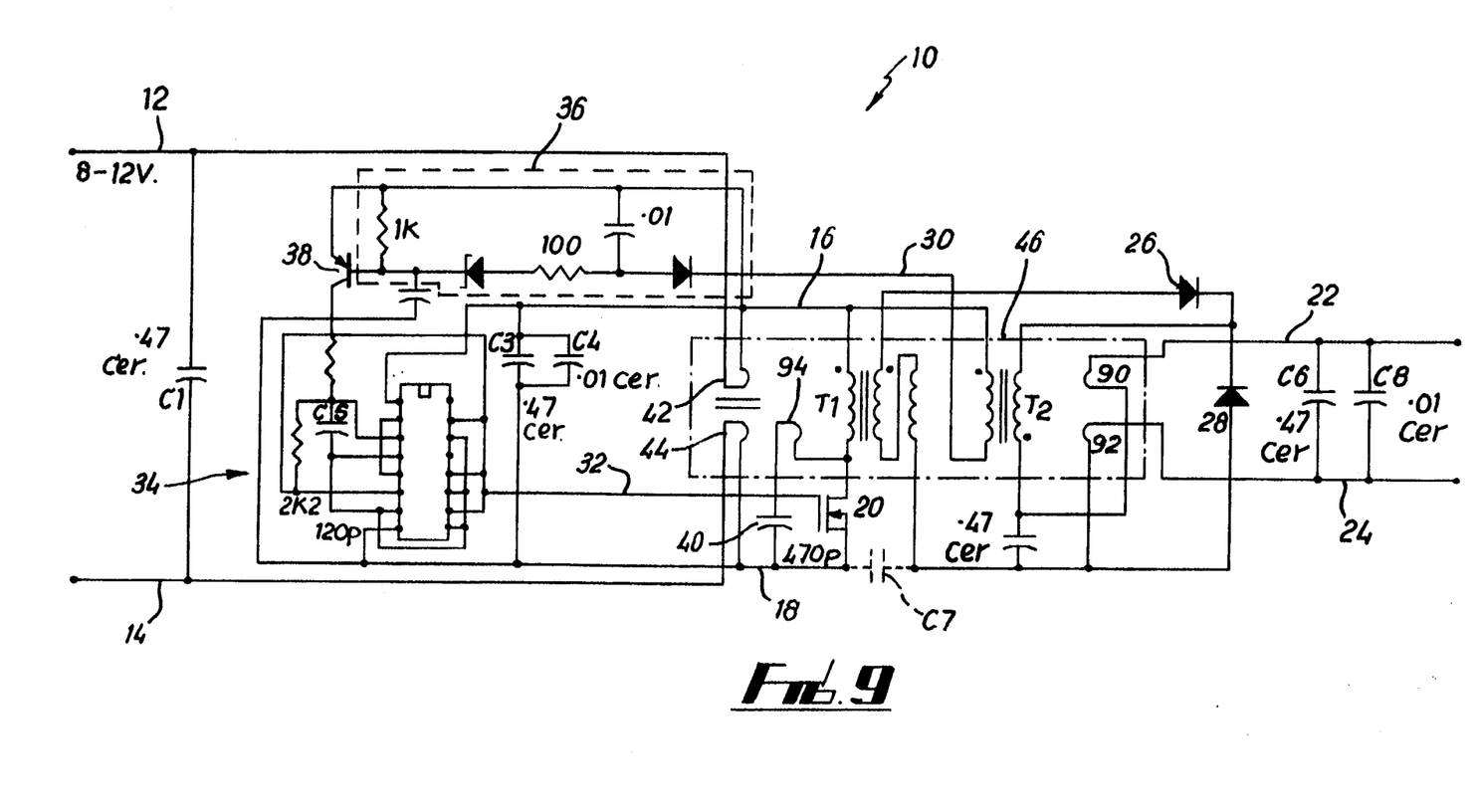
FIGS. 9, 10 and 11 are circuit diagrams showing modified forms of the circuit of FIG. 1.
Figure 10:
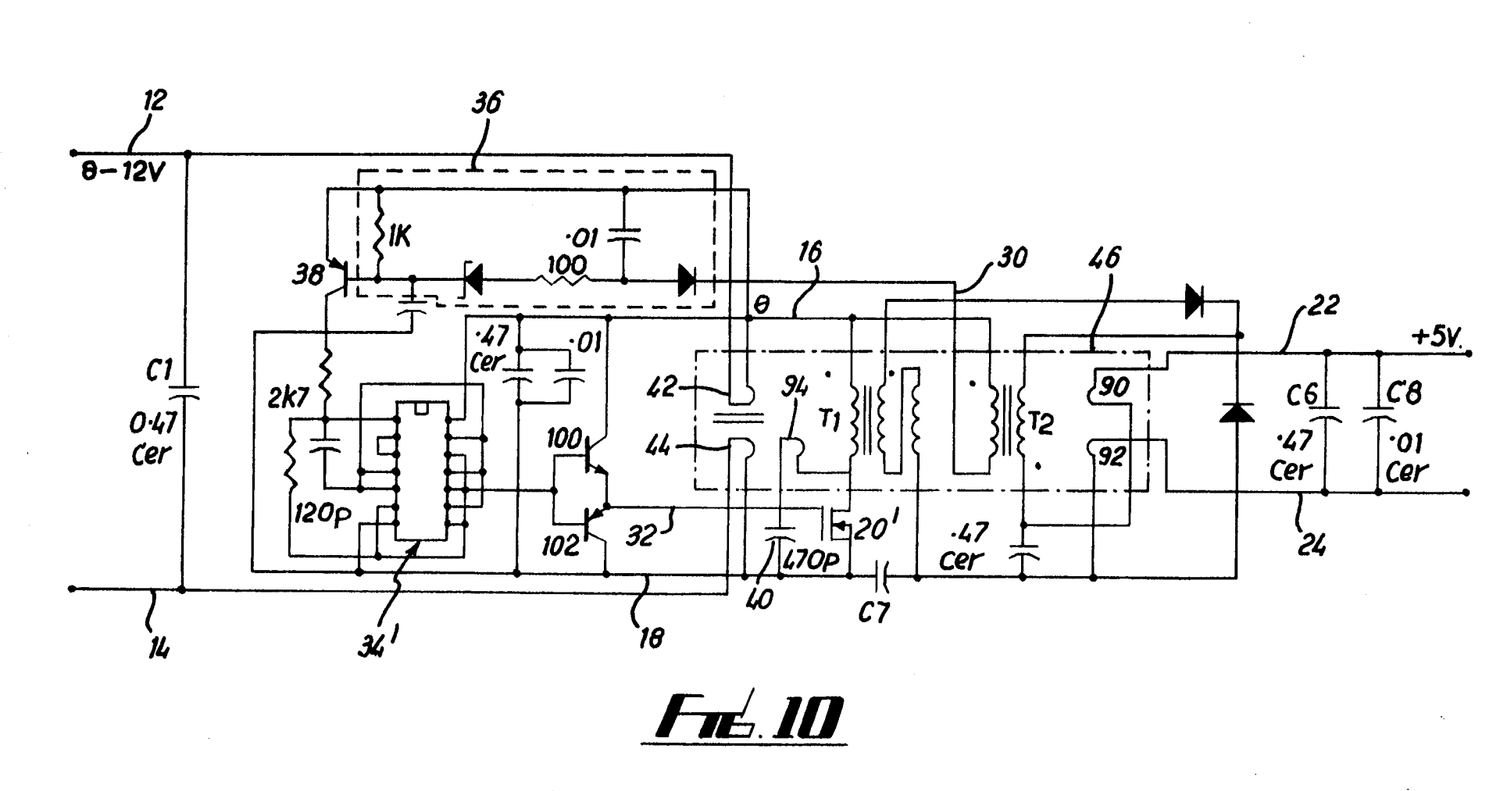
Figure 11:
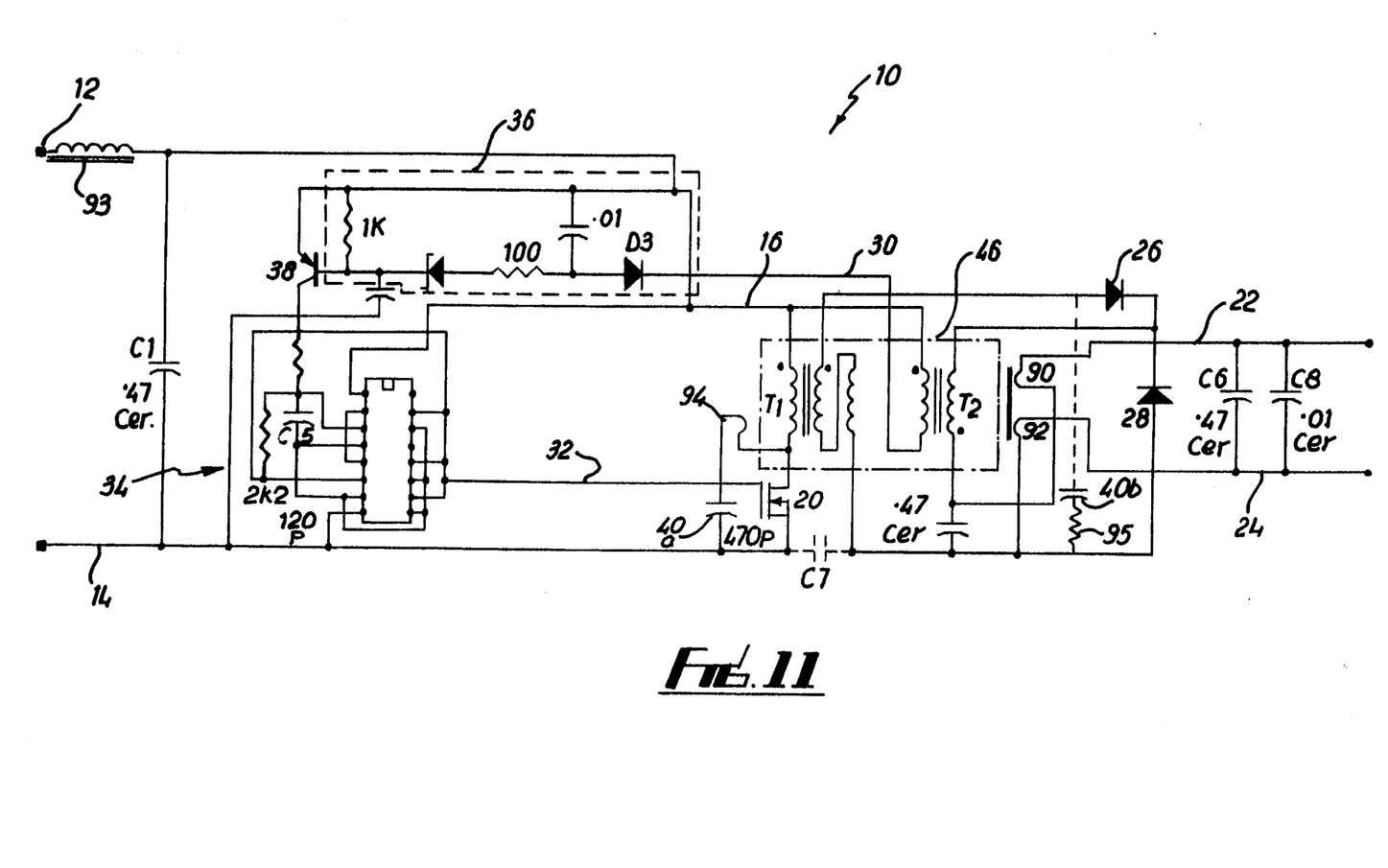

FIGS. 9, 10 and 11 show modified converter circuits. In these Figures, parts equivalent to those of FIG. 1 are denoted by like reference numerals.

The circuit of FIG. 9 has additional ferrite bead equivalent inductors 90, 92, 94. The first two of these form an additional output filter, while the third is used to reduce any unwanted ringing on the drain waveform of MOSFET 20. The inductor 94, however, will not usually be required if the transformer T1 has been wound correctly.

In FIG. 10, the MOSFET 20' is of type IRFR 111, in place of the type ZVN 4206 MOSFET 20 of FIGS. 1 and 9. This requires a higher driving current which is provided by transistor pair 100, 102 interposed between the gate of MOSFET 20' and the hex inverter 34', which in this embodiment is type 4069. The transistors 100, 102 may suitably be BSR13 and BSR16, respectively.

The particular ferrite structure described above was found to be particularly suitable since it could be made from available components and gives a surface area of convenient size for mounting the components. Many other topographies are, however, possible within the scope of the invention.

Figure 12:
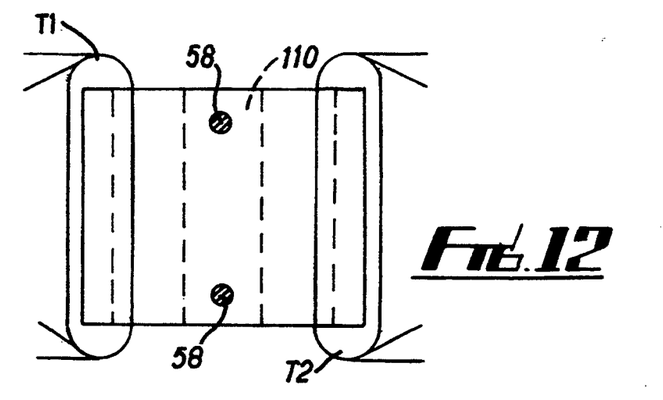
FIGS. 12 to 15 are schematic plan views illustrating alternative forms of ferrite structure in accordance with the invention; and, FIG. 16 is a side view of a modified embodiment of converter.

FIG. 12 shows a single ferrite balun 110 of the type used above, with the windings located in a similar manner. This gives an overall size of 11×11×5 mm; this is likely to be too small a surface area to use the ferrite as a substrate for the components as described, but they can be mounted on a rigid pcb associated with the balun. The magnetic capability of this arrangement would be sufficient for a converter handling at least 3 W to 4 W, and for high input voltages this is likely to extend to 10 W.

FIG. 11 shows an embodiment utilising the single balun structure of FIG. 12. This is similar in circuit details to the foregoing embodiments but a few changes need to be made since the available channels 54 in the ferrite structure have been reduced from four to two. Firstly, a discretely wound input filter 93 is used between input line 12 and supply line 16; this may be a small toroid. The resonant reset capacitor 40 has been split to provide better freedom from ringing. The capacitor is now shown as 40a and 40b, the latter on the secondary and having a small series damping resistor. Also optionally a ferrite bead inductor 94 can be added either in series with capacitor 40a or in series with the drain connection of MOSFET 20 for further reduced overshoots. Again in an optimally designed unit these should not be required. Common mode inductors 90, 92 are added externally to reduce common mode noise to very low levels and may be in the position shown or after capacitor C6.

Figure 13:
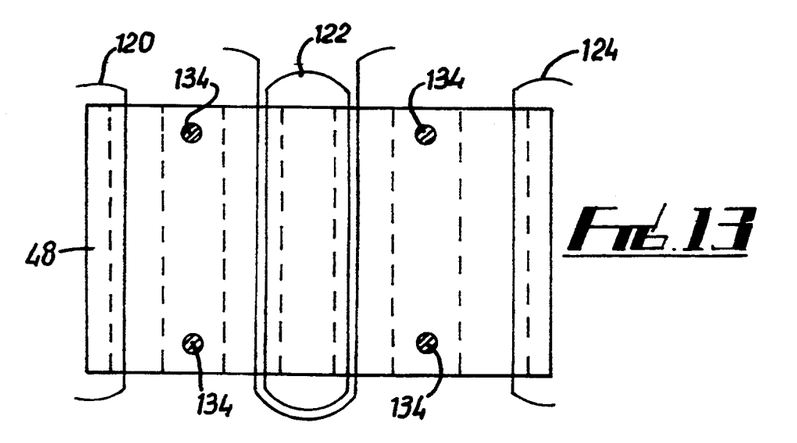
Figure 14:
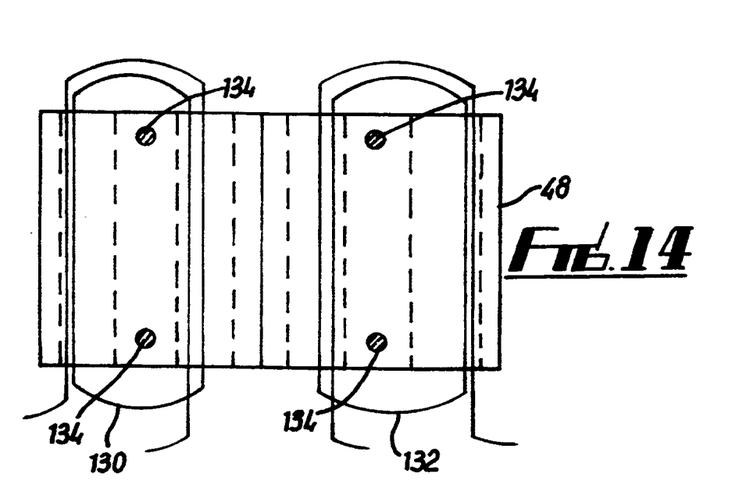

FIGS. 13 and 14 illustrate the use of a ferrite structure 48 as in FIGS. 3 and 4 with different winding arrangements. FIG. 13 has three totally separated windings 120, 122, 124 plus four input/output filter beads 134. The vertical wires associated with these effective beads also act as the input and output connections for the unit. FIG. 14 has two separated windings 130, 132 but each winding has two channels thus keeping stray fields to a minimum; it is also more applicable to higher power units up to 10 or 15 W due to the higher Ae obtained.

Figure 15:
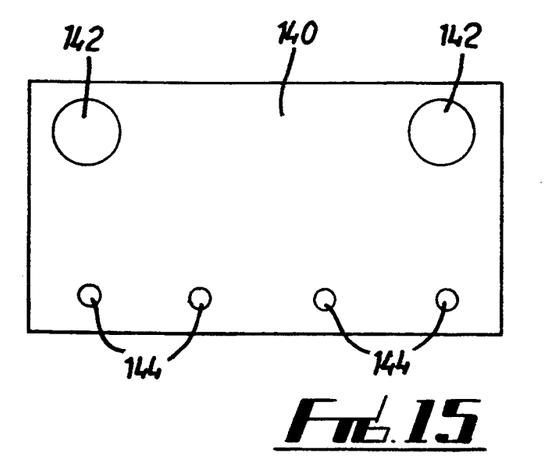

The ferrite structure need not be of balun configuration. For example, FIG. 15 shows a slab 140 of B1 ferrite material drilled with two holes 142 through which toroidal inductors may be wound and four holes 144 to receive vertical wires to produce a ferrite bead effect.

Figure 16:
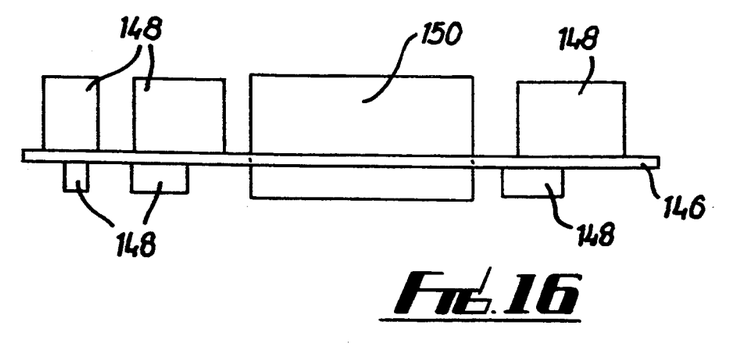

FIG. 16 illustrates an arrangement in which the circuit components cannot be contained within the surface area of the ferrite structure. A printed circuit board 146 mounts components 148 of the converter circuit, which may be any of the circuits discussed above. The ferrite structure 150 is mounted within an aperture in the pcb 146; the aperture may be a slot within the board or a notch at the edge of the board. Advantageously, the ferrite structure 150 is chosen to have a height and position in the pcb 146 such that, as shown it extends just beyond the components 148.

Other modifications are possible within the scope of the invention. For example, the ferrite structure could be made by securing together high and low permeability materials into an integral unit. By way of example, the balun from Philips already discussed is also available in 4A11 and 3C85 materials which have ui of 700 and 2000 respectively, compared to an ui of 250 for 4B1 material. It would also be possible to use holes drilled very close to the edge of the ferrite as a small localised saturating inductor for use, for example, over diode leads to reduce reverse recovery spikes.

What we claim is:

1. A dc-to-dc converter having resonant reset and comprising:
   an input,
   an output,
   a first transformer having a primary winding and a secondary winding wound on a common integrated magnetic structure,
   a switching element and capacitance means arranged to switch the input across the primary winding of the first transformer and cause said resonant reset of said common integrated magnetic structure,
   oscillator means connected to control said switching element,
   the secondary winding of the first transformer being connected to the output via a path including a diode pair and a primary winding of a second transformer,
   the second transformer having a secondary winding connected to provide a feedback signal controlling operation of said oscillator means, said primary and secondary windings of said second transformer wound on said common integrated magnetic structure;
   and in which said common integrated magnetic structure comprises a body of ferrite material formed with a plurality of passages through which said windings pass, and each said passage traversing an integral mass of ferrite such that each said passage is entirely encircled by a continuous ferrite periphery, and wherein certain of said passages and said first and second transformer windings are so spaced on said integrated magnetic structure that said first and second transformers have separate non-coupled independent magnetic functions.

2. A dc-to-dc converter according to claim 1, in which said body of ferrite material is in the form of a ferrite slab having parallel upper and lower major faces and side edges, and in which said through passages traverse the slab edge-to-edge parallel with said upper and lower faces.

3. A dc-to-dc converter according to claim 1, in which said body of ferrite material is formed from a plurality of ferrite slabs secured together edge-to-edge to form said common integrated magnetic structure.

4. A dc-to-dc converter according to claim 2, in which said ferrite slab includes a second plurality of through passages traversing the slab between said upper and lower faces, parallel to and adjacent said edges.

5. A dc-to-dc converter in accordance with claim 2 in which electronic components of the dc-to-dc converter are mounted on at least one of said major faces of said ferrite slab.

6. A dc-to-dc converter according to claim 5, in which said electronic components are on a printed circuit board mounted to said one major face of said ferrite slab.

7. A dc-to-dc converter according to claim 5, in which said electronic components are mounted directly to said one major face of said ferrite slab.

8. A dc-to-dc converter according to claim 7, in which the ferrite slab is heated to provide an oxidized surface film prior to mounting of the components.

9. A dc-to-dc converter in accordance with claim 2 and further comprising a plurality of electronic components mounted on a printed circuit board, the printed circuit board being formed to define an aperture within which said common integrated magnetic structure is received.

10. A converter according to claim 1, in which the ferrite body is in the form of a slab having upper and lower major faces and side edges, and in which the switching element and oscillator means are mounted on one of said major faces.

11. A converter according to claim 1, in which the switching element is a MOSFET device having a capacitance connected across it to provide said resonant reset.

12. A converter according to claim 1, in which said feedback signal is peak-detected, filtered and referenced before being applied to said oscillator means as a control signal.

13. A relative low-power high-frequency integrated magnetic and switching circuit dc-to-dc converter comprising:

an integrated magnetic and circuit mounting structure having a core body of homogeneous ferrite material in the shape of a slab defining upper and lower major faces and formed with a plurality of separate spaced winding passages, and having thereon a first transformer including magnetically coupled primary and secondary windings extending through a first of said passages and being magnetically coupled by a first portion of said core body, and having thereon a second transformer including magnetically coupled primary and secondary windings extending through a second of said passages and being magnetically coupled by a second portion of said core body spaced and magnetically isolated from said first portion so that said first and second transformers are magnetically non-coupled and independent;

an input;

a solid state switching element mounted on one of said major faces of said slab of ferrite material and connected to switch said input across the primary winding of said first transformer and resonant capacitance means connected to said switching element and primary winding of the first transformer for resonant reset of the magnetic core flux of said integrated magnetic structure;

oscillator means mounted on one of the major faces of said slab of ferrite material and connected to said solid state switching element for controlling the switching frequency thereof;

an output;

a pair of rectification diodes mounted on one of the major faces of said slab of ferrite material and connecting the secondary winding of the first transformer to said output in an output path that includes the primary winding of said second transformer; and oscillator control circuit means mounted on one of the major faces of said slab of ferrite material and connecting the secondary winding of said second transformer to said oscillator means for controlling said switching frequency.

* * * * *